United States Patent
Hu

(10) Patent No.: US 8,023,701 B2
(45) Date of Patent: Sep. 20, 2011

(54) METHOD, APPARATUS, AND PROGRAM FOR HUMAN FIGURE REGION EXTRACTION

(75) Inventor: Yi Hu, Kanagawa-ken (JP)

(73) Assignee: Fujifilm Corporation (JP)

(*) Notice: Subject to any disclaimer, the term of this patent is extended or adjusted under 35 U.S.C. 154(b) by 1095 days.

(21) Appl. No.: 11/822,087

(22) Filed: Jul. 2, 2007

(65) Prior Publication Data

US 2008/0008362 A1    Jan. 10, 2008

(30) Foreign Application Priority Data

Jul. 4, 2006  (JP) .................................. 2006-184019

(51) Int. Cl.
*G06K 9/00* (2006.01)
(52) U.S. Cl. ...................................................... 382/118
(58) Field of Classification Search .................. 382/103, 382/118, 159, 173, 190, 224
See application file for complete search history.

(56) References Cited

U.S. PATENT DOCUMENTS

| | | | | |
|---|---|---|---|---|
| 5,978,100 | A * | 11/1999 | Kinjo ............................ | 358/453 |
| 6,028,960 | A * | 2/2000 | Graf et al. ..................... | 382/203 |
| 6,118,888 | A * | 9/2000 | Chino et al. ................... | 382/118 |
| 6,529,630 | B1 * | 3/2003 | Kinjo ............................ | 382/190 |
| 6,611,613 | B1 * | 8/2003 | Kang et al. .................... | 382/118 |
| 6,885,761 | B2 * | 4/2005 | Kage ............................. | 382/118 |
| 7,079,669 | B2 * | 7/2006 | Hashimoto et al. ........... | 382/118 |
| 2003/0044070 | A1 | 3/2003 | Fuersich et al. | |
| 2003/0107653 | A1 | 6/2003 | Utsumi et al. | |

FOREIGN PATENT DOCUMENTS

| | | |
|---|---|---|
| JP | H11-316845 A | 11/1999 |
| JP | 2003-109008 A | 4/2003 |
| JP | 2003-178303 A | 6/2003 |
| JP | 2004-220555 A | 8/2004 |
| JP | 2005-339363 A | 12/2005 |

OTHER PUBLICATIONS

Boykov et al., "Interactive Graph Cuts for Optimal Boundary & Region Segmentation of Objects in N-D Images," Proceedings of "Internation Conference on Computer Vision," Siemens Corporate Research, vol. 1, 2001, pp. 105-112.
Orchard et al., "Color Quantization of Images," IEEE Transactions on Signal Processing, vol. 39, No. 12, 1991, pp. 2677-2690.
Rother et al., "GrabCut—Interactive Foreground Exxtraction using Iterated Graph Cuts," ACM Transactions on Graphics (SIGGRAPH '04), 2004.

(Continued)

*Primary Examiner* — Daniel Mariam
(74) *Attorney, Agent, or Firm* — Studebaker & Brackett PC; Donald R. Studebaker

(57) ABSTRACT

Upon extraction of a human figure region in an image, a face or facial part is detected in the image, and a candidate region that is deemed to include the human figure region is determined from position information of the detected face or facial part. Judgment is made as to whether each unit region having 2 pixels or more and comprising the candidate region represents the human figure region, and a set of the unit regions having been judged to represent the human figure region is determined as an estimated region which is estimated to include the human figure region. The human figure region is then extracted in the determined estimated region.

20 Claims, 12 Drawing Sheets

OTHER PUBLICATIONS

Japanese Office Action "Notice of Grounds for Rejection" dated Mar. 15, 2011; Japanese Patent Application No. 2007-184019 with translation.

Mori et al., "Recovering Human Body Configurations: Combining Segmentation and Recognition" Computer Vision and Pattern Recognition, 2004, CVPR 2004, pp. II-326-II-333 vol. 2; Issued Jun. 27-Jul. 2, 2004.

Smith et al.. "Tools and Techniques for Color Image Retrieval", IS&T/ SPIE Proceeding vol. 2670, Storage & Retrieval for Image and Video Databases IV, pp. 426-437, publised Mar. 1996.

* cited by examiner

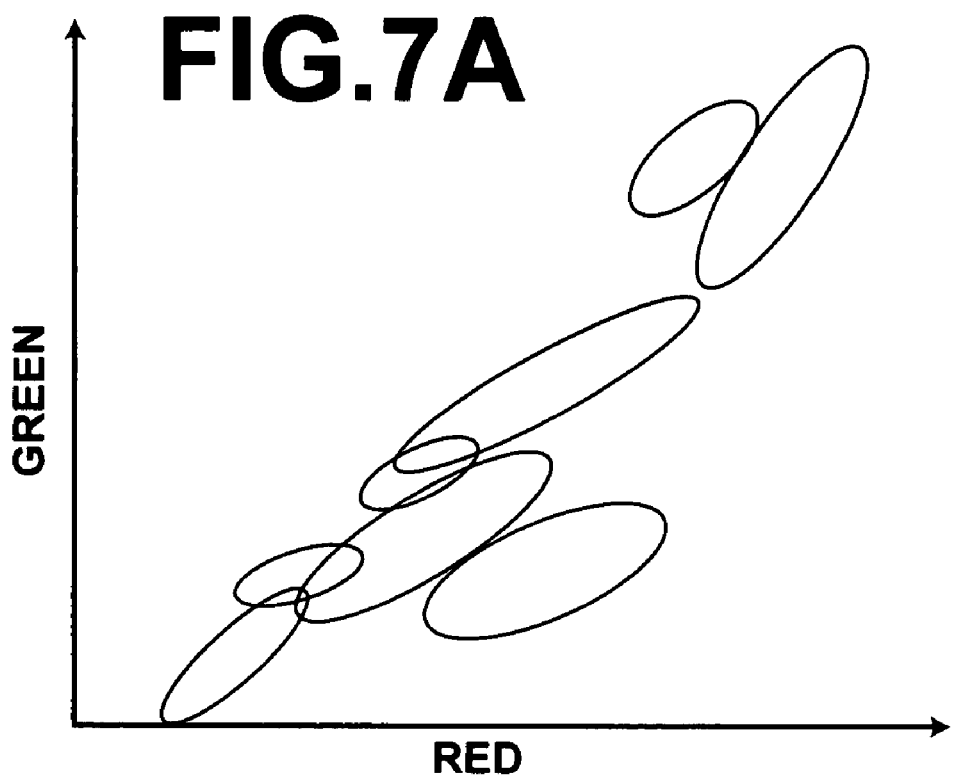
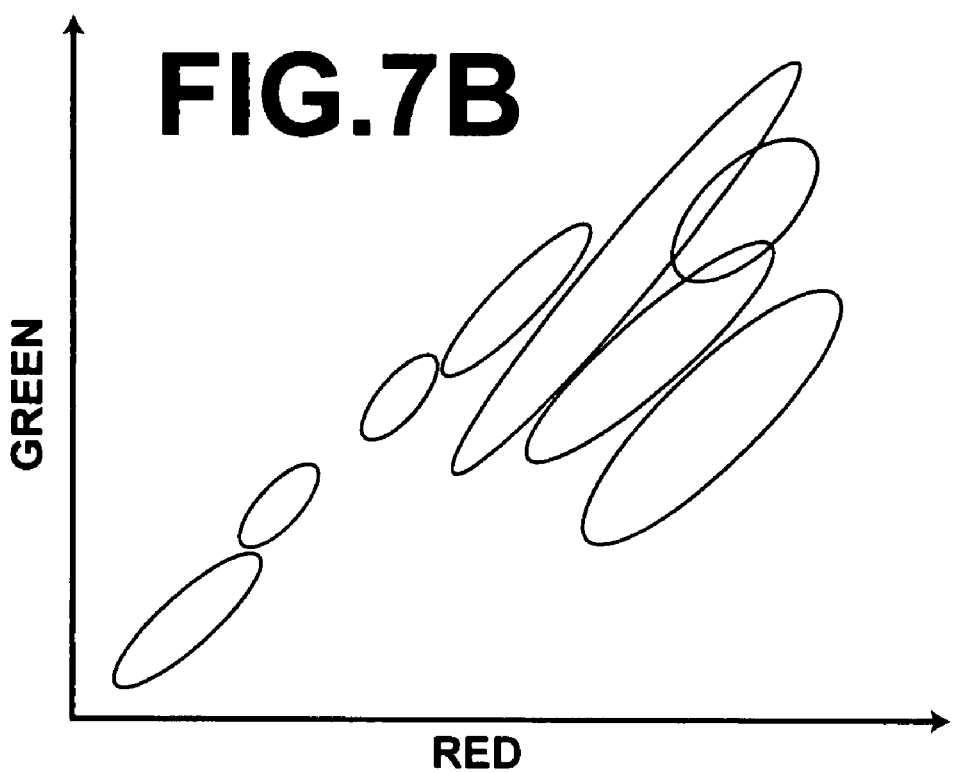

METHOD, APPARATUS, AND PROGRAM FOR HUMAN FIGURE REGION EXTRACTION

BACKGROUND OF THE INVENTION

1. Field of the Invention

The present invention relates to a method and an apparatus for extracting a human figure region in an image. The present invention also relates to a program therefor.

2. Description of the Related Art

For image editing such as image classification, automatic trimming, and electronic photo album generation, extraction of human figure regions and recognition of poses in images are expected. As a method of extraction of human figure regions by separation from backgrounds in images, a method described in Japanese Unexamined Patent Publication No. 2005-339363 is known, for example. In this method, a person is photographed with a predetermined specific background, and a human figure region is cut out from the background based on differences in colors therebetween.

In addition to a method using a predetermined background setting as has been described above, a method of separating a human figure region from any arbitrary background in an image by advance manual input of information on a portion of the human figure region and the background has been proposed in Y. Boykov and M. Jolly, "Interactive Graph Cuts for Optimal Boundary & Region Segmentation of Objects in N-D Images", Proc. of Int. Conf. on Computer Vision, Vol. I, pp. 105-112, 2001. This method, which adopts advance specification of a portion of human figure regions and backgrounds, is used mainly for interactive cutting.

Furthermore, an automatic human figure region extraction method has been proposed in G. Mori et al., "Recovering Human Body Configurations: Combining Segmentation and Recognition", CVPR, pp. 1-8, 2004. In this method, a whole image is subjected to region segmentation processing and judgment is made on each region as to whether the region is a portion of a human figure region based on characteristics such as a shape, a color, and texture thereof. An assembly of the regions which are judged to be portions of a human figure is automatically extracted as a human figure region.

However, in this method of human figure region extraction using the characteristics of respective regions generated through segmentation, human figure regions cannot be extracted correctly in the case where a degree of segmentation is not appropriate for human figure extraction, such as the case where regions generated through segmentation are too small for accurate judgment of portions of a human figure region, or too large and include background regions as well. Therefore, the accuracy of human figure region extraction is strongly affected by the degree of segmentation in this method.

SUMMARY OF THE INVENTION

The present invention has been conceived based on consideration of the above circumstances, and an object of the present invention is therefore to provide a method, an apparatus, and a program that automatically extract a human figure region in a general image with improved extraction performance.

A human figure region extraction method of the present invention is a method of extracting a human figure region in an image, and the method comprises the steps of:

detecting a face or facial part in the image;

determining a candidate region that is deemed to include the human figure region, based on position information of the face or facial part having been detected;

carrying out judgment as to whether each unit region of 2 pixels or more comprising the candidate region represents the human figure region;

determining a set of the unit regions having been judged to represent the human figure region as an estimated region that is estimated to include the human figure region; and extracting the human figure region in the determined estimated region.

The human figure region extraction method of the present invention may further comprise the step of:

judging whether at least a portion of the extracted human figure region exists in an outline periphery region in the estimated region. In this case, it is preferable for the human figure region extraction method of the present invention to repeat the steps of:

extending and updating the estimated region so as to include a near outer region that is located outside the estimated region and near the human figure region in the outline periphery region;

extracting the human figure region in the extended and updated estimated region; and repeatedly judging whether at least a portion of the extracted human figure region exists in the outline periphery region in the extended and updated estimated region, until the extracted human figure region has been judged not to exist in the outline periphery region.

A human figure region extraction apparatus of the present invention is an apparatus for extracting a human figure region in an image, and the apparatus comprises:

face detection means for detecting a face or facial part in the image;

candidate region determination means for determining a candidate region that is deemed to include the human figure region, based on position information of the face or facial part having been detected;

unit region judgment means for carrying out judgment as to whether each unit region of 2 pixels or more comprising the candidate region represents the human figure region;

estimated region determination means for determining a set of the unit regions having been judged to represent the human figure region as an estimated region that is estimated to include the human figure region; and human figure region extraction means for extracting the human figure region in the determined estimated region.

It is preferable for the human figure region extraction apparatus of the present invention to further comprise:

human figure region presence judgment means for judging whether at least a portion of the extracted human figure region exists in an outline periphery region in the estimated region. In this case, it is preferable for the estimated region determination means, the human figure region extraction means, and the human figure region presence judgment means to respectively repeat:

extending and updating the estimated region so as to include a near outer region that is located outside the estimated region and near the human figure region in the outline periphery region;

extracting the human figure region in the extended and updated estimated region; and repeatedly judging whether at least a portion of the extracted human figure region exists in the outline periphery region in the extended and updated estimated region, until the human figure region presence judgment means has judged that the extracted human figure region does not exist in the outline periphery region.

The unit region judgment means may comprise classifiers corresponding to the respective unit regions and respectively carrying out the judgment as to whether the corresponding unit regions represent the human figure region.

The candidate region determination means may determine a plurality of candidate regions. In this case, the unit region judgment means judges whether each unit region of 2 pixels or more comprising the respective candidate regions represents the human figure region, and the estimated region determination means determines a set of the unit regions having been judged to be included in the human figure region in each of the candidate regions as an estimated region candidate and selects an optimal estimated region candidate from the estimated region candidates. The estimated region determination means then determines the selected estimated region candidate as the estimated region which is estimated to include the human figure region.

The human figure region extraction means can calculate an evaluation value for each pixel in the estimated region from image data therein and from image data in an outside region located outside the estimated region, and can extract the human figure region based on the evaluation value.

In addition, the human figure region extraction means can extract the human figure region by further using skin color information in the image.

A human figure region extraction program of the present invention is a program for extracting a human figure region in an image, and the program causes a computer to:

detect a face or facial part in the image;

determine a candidate region that is deemed to include the human figure region, based on position information of the face or facial part having been detected;

carry out judgment as to whether each unit region of 2 pixels or more comprising the candidate region represents the human figure region;

determine a set of the unit regions having been judged to represent the human figure region as an estimated region that is estimated to include the human figure region; and extract the human figure region in the determined estimated region.

The program can further cause the computer to judge whether at least a portion of the extracted human figure region exists in an outline periphery region in the estimated region, and can cause the computer repeat:

extending and updating the estimated region so as to include a near outer region that is located outside the estimated region and near the human figure region in the outline periphery region;

extracting the human figure region in the extended and updated estimated region; and repeatedly judging whether at least a portion of the extracted human figure region exists in the outline periphery region in the extended and updated estimated region, until the extracted human figure region has been judged not to exist in the outline periphery region.

The candidate region may be determined only from the position information of the face or facial part or from the position information as well as other information such as face size information for the case of face, for example.

The outline periphery region refers to a region of a predetermined range from an outline of the estimated region and within the estimated region, and may refer to a region of the predetermined range including the outline, a region of the predetermined range excluding the outline, or only the outline.

According to the method, the apparatus, and the program of the present invention for human figure region extraction, the face or facial part is detected in the image, and the candidate region which is deemed to include the human figure region is determined from the position information of the face or facial part having been detected. Judgment is then made as to whether each of the unit regions of 2 pixels or more comprising the determined candidate region represents the human figure region, and the set of the unit regions having been judged to represent the human figure region is determined as the estimated region. The human figure region is then extracted in the estimated region. In this manner, the human figure region can be extracted automatically from the general image with accuracy.

As a method of extracting the human figure region, a method may be used wherein a face or facial part is detected in an image and an estimated region that is estimated to include a human figure region is determined for extraction of the human figure region therein, based on position information of the face or facial part. In this case, it is preferable for the estimated region to include more of the human figure region and to exclude a background region as much as possible, in order to extract the human figure region with high accuracy. However, the candidate region that is deemed to include the human figure region is determined first in the present invention based on the position information of the face or facial part, and the judgment is made on whether each of the unit regions comprising the candidate region represents the human figure region. The estimated region is then determined as the set of the unit regions having been judged to represent the human figure region. Therefore, the estimated region can be determined as a region including more of the human figure region but excluding the background region as much as possible. As a result, the human figure region can be extracted in the estimated region with high accuracy.

In the method, the apparatus, and the program of the present invention, in the case where the judgment is carried out as to whether at least a portion of the human figure region exists in the outline periphery region in the estimated region, if the procedures of extension and update of the estimated region so as to include the near outer region located outside the estimated region and near the human figure region in the outline periphery region, extraction of the human figure region in the extended and updated estimated region, and the judgment as to whether at least a portion of the extracted human figure region exists in the outline periphery region in the extended and updated estimated region are repeated until the extracted human figure region has been judged not to exist in the outline periphery region, the human figure region can be included in the extended and updated estimated region based on a result of human figure region extraction even in the case where the human figure region has not been included in the estimated region. Therefore, the human figure region can be extracted entirely with accuracy.

In the case where the unit region judgment means comprises the classifiers that correspond the respective unit regions and judge whether the corresponding unit regions represent the human figure region, the judgment can be made efficiently with accuracy.

In the case where the candidate region determination means determines the plurality of candidate regions, the unit region judgment means judges whether each of the unit regions of 2 pixels or more comprising the respective candidate regions represents the human figure region. The estimated region determination means then determines as the estimated region candidates the sets of the unit regions having been judged to include the human figure region for the respective candidate regions, and selects the optimal estimated region candidate from the estimated region candidates as the estimated region that is estimated to include the human figure region. In this manner, the estimated region can be determined appropriately for the human figure region having various sizes and poses. Consequently, accuracy of the human figure region extraction can be improved.

In the case where the human figure region extraction is carried out according to the evaluation value calculated for each pixel in the estimated region based on the image data therein and in the outside region located outside the estimated region, judgment can be appropriately made as to whether each pixel in the estimated region represents the human figure region or a background region, by using the image data of the estimated region largely including the human figure region and the image data of the outside region located outside the estimated region and thus including largely the background region. In this manner, the human figure region extraction can be carried out with accuracy.

In addition, in the case where the human figure region extraction is carried out by use of the skin color information in the image, accuracy of the human figure region extraction can be improved.

BRIEF DESCRIPTION OF THE DRAWINGS

FIG. 7A is a graph showing R (Red) and G (Green) in a human figure region model $G_H$ while FIG. 7B is a graph showing R and G in a background region model $G_B$;

DESCRIPTION OF THE PREFERRED EMBODIMENT

Figure 1:
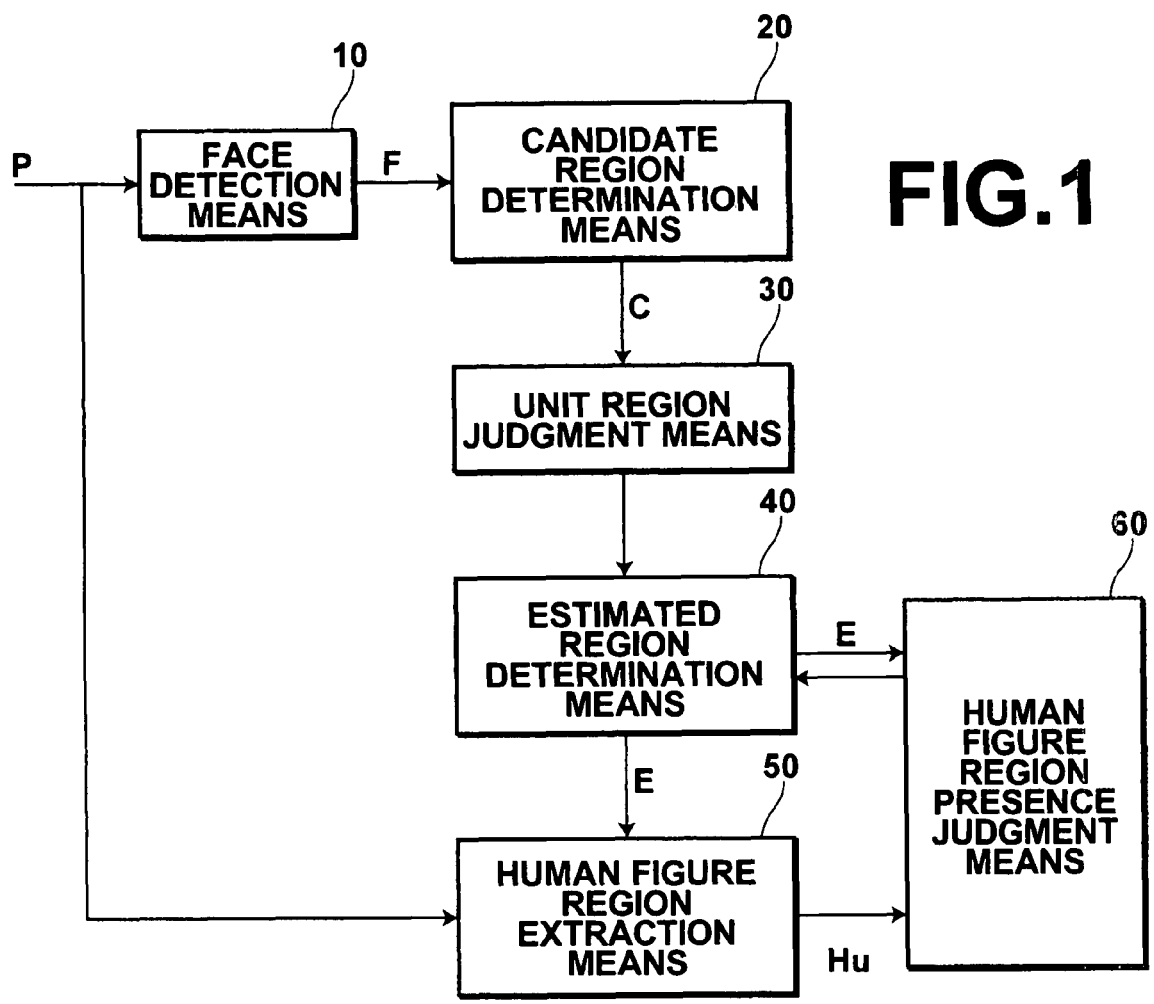
FIG. 1 is a block diagram showing an embodiment of a human figure region extraction apparatus of the present invention.

Hereinafter, an embodiment of a human figure region extraction apparatus of the present invention will be described with reference to the accompanying drawings. A human figure region extraction apparatus as an embodiment of the present invention shown in FIG. 1 is realized by executing an image processing program read into an auxiliary storage apparatus on a computer (such as a personal computer). The image processing program is stored in an information recording medium such as a CD-ROM or distributed via a network such as the Internet, and installed in the computer.

The human figure region extraction apparatus of this embodiment is to automatically extract a human figure region in a general image P, and the apparatus comprises face detection means 10, candidate region determination means 20, unit region judgment means 30, estimated region determination means 40, human figure region extraction means 50, and human figure region presence judgment means 60. The face detection means 10 detects eyes F as facial parts in the image P. The candidate region determination means 20 determines a plurality of candidate regions C (Cn, n=1~k) which are deemed to include the human figure region, based on position information of the eyes F having been detected. The unit region judgment means 30 judges whether each unit region $B_{ij}$ (i=1~M, j=1~N) of w×h pixels comprising the respective candidate regions Cn represents the human figure region. The estimated region determination means 40 determines a set of the unit regions $B_{ij}$ having been judged to represent the human figure region for each of the candidate regions Cn as an estimated region candidate En, and selects an optimal estimated region candidate from the estimated region candidates En to determine the optimal estimated region candidate as an estimated region E which is estimated to include the human figure region. The human figure region extraction means 50 extracts a human figure region Hu in the estimated region E having been determined. The human figure region presence judgment means 60 judges whether at least a portion of the human figure region Hu exists in an outline periphery region in the estimated region E.

In the case where the human figure region presence judgment means 60 has judged that at least a portion of the extracted human figure region Hu exists in the outline periphery region in the estimated region E, the estimated region determination means 40 extends and updates the estimated region E so as to include a near outer region located outside the estimated region E and near the human figure region Hu in the outline periphery region. In this case, the human figure region extraction means 50 extracts the human figure region Hu in the extended and updated estimated region E (hereinafter simply referred to as the extended estimated region E).

The face detection means 10 is to detect the eyes F as facial parts in the image P. The face detection means 10 firstly obtains detectors corresponding to characteristic quantities which detect a detection target such as a face or eyes by pre-learning the characteristic quantities of pixels in sample images wherein the detection target is known, that is, by pre-learning direction and magnitude of change in density in the pixels in the images, as has been described in Japanese Unexamined Patent Publication No. 2006-139369, for example. The face detection means 10 then detects a face image by using this known technique, through scanning of the image P with the detectors. The face detection means 10 detects eye positions Fr and Fl in the face image.

Figure 2A:
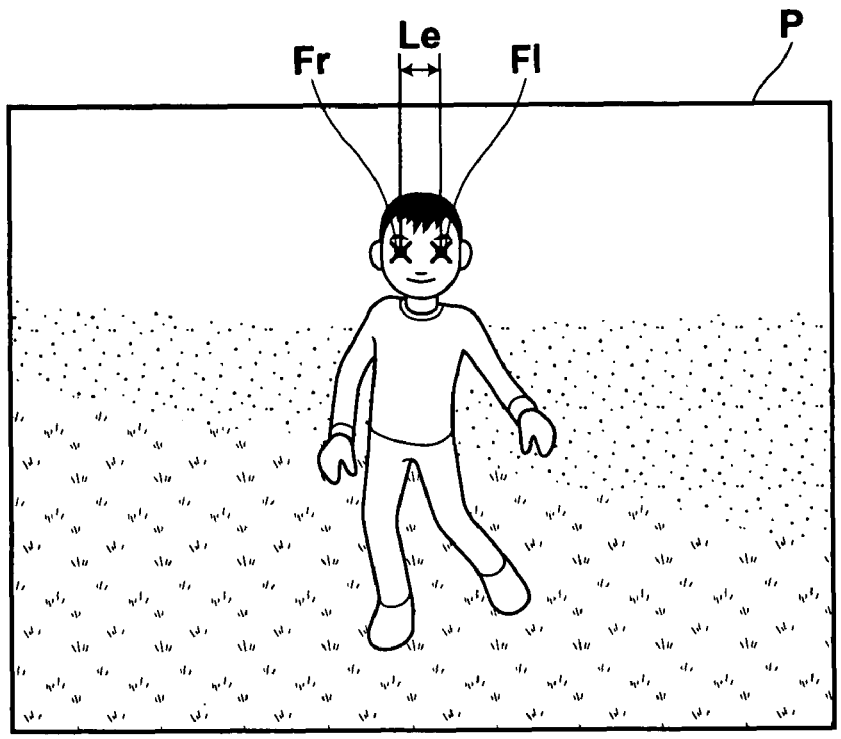
FIGS. 2A and 2B show a method of determining candidate regions C by candidate region determination means in FIG. 1.
Figure 2B:
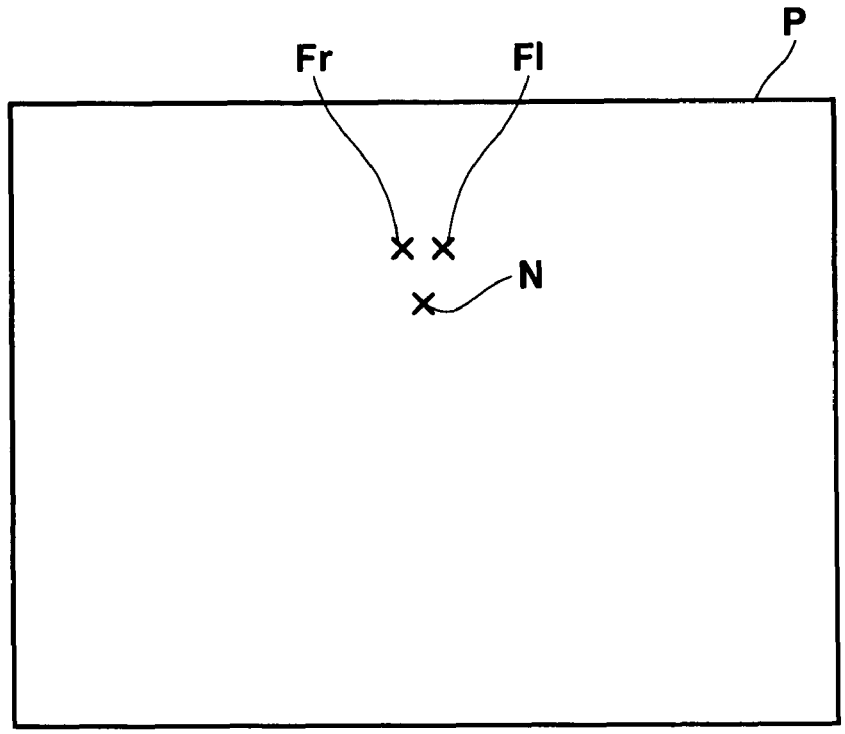
Figure 3:
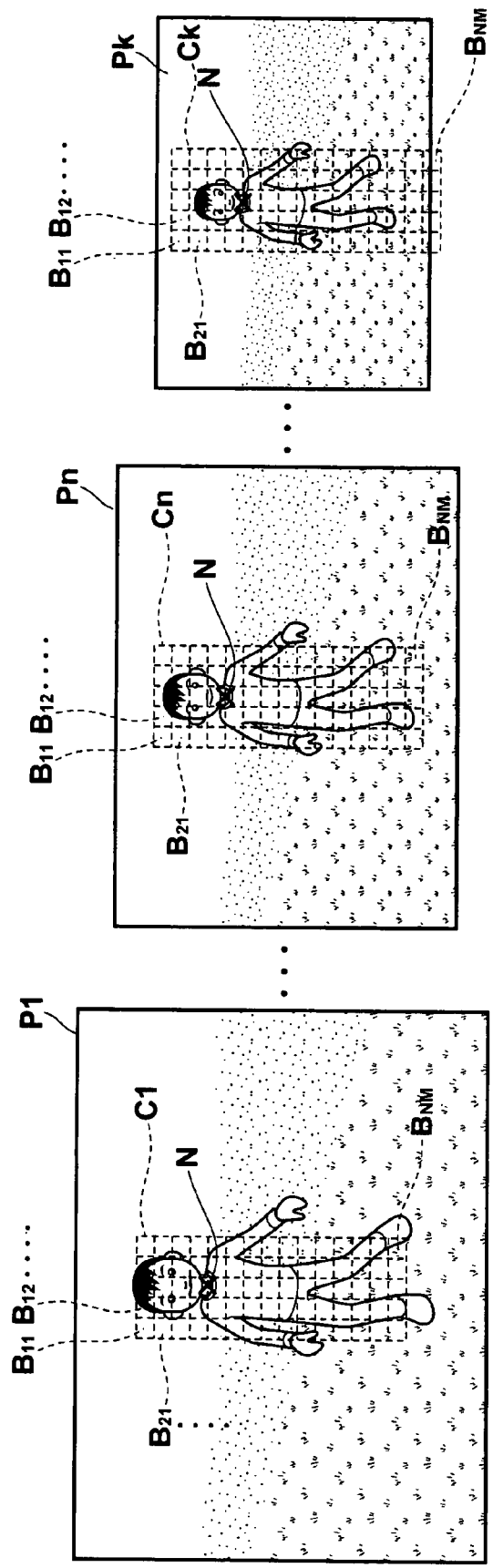
FIG. 3 shows candidate regions Cn determined by the candidate region determination means.

The candidate region determination means 20 determines the candidate regions C1~Ck which are deemed to include the human figure region Hu, based on position information of the eyes F detected by the face detection means 10. Firstly, as shown in FIGS. 2A and 2B, the candidate region determination means 20 finds a distance D between the detected eyes Fr and Fl, and determines a position located at a distance of 1.5 D below the midpoint between the eyes as a center position N of the neck. Thereafter, the candidate region determination means 20 arbitrarily selects k values within a range of 1.2 D to 1.8 D, and uses each of the selected values as a width of the neck. The candidate region determination means then enlarges or reduces the image P so as to cause the width of the neck to become a predetermined length (such as a horizontal width of the unit region $B_{ij}$ that will be described later) in the enlarged or reduced image, and generates enlarged or reduced images Pn (n=1~k) in a plurality of resolutions as shown in FIG. 3. Thereafter, the candidate region determination means 20 determines a rectangular region of a predetermined size (N·w×M·h pixels) with reference to the center position N of the neck as a candidate region Cn for each of the images Pn. The candidate regions Cn have the same absolute size but different relative sizes to the enlarged or reduced images.

Figure 4:
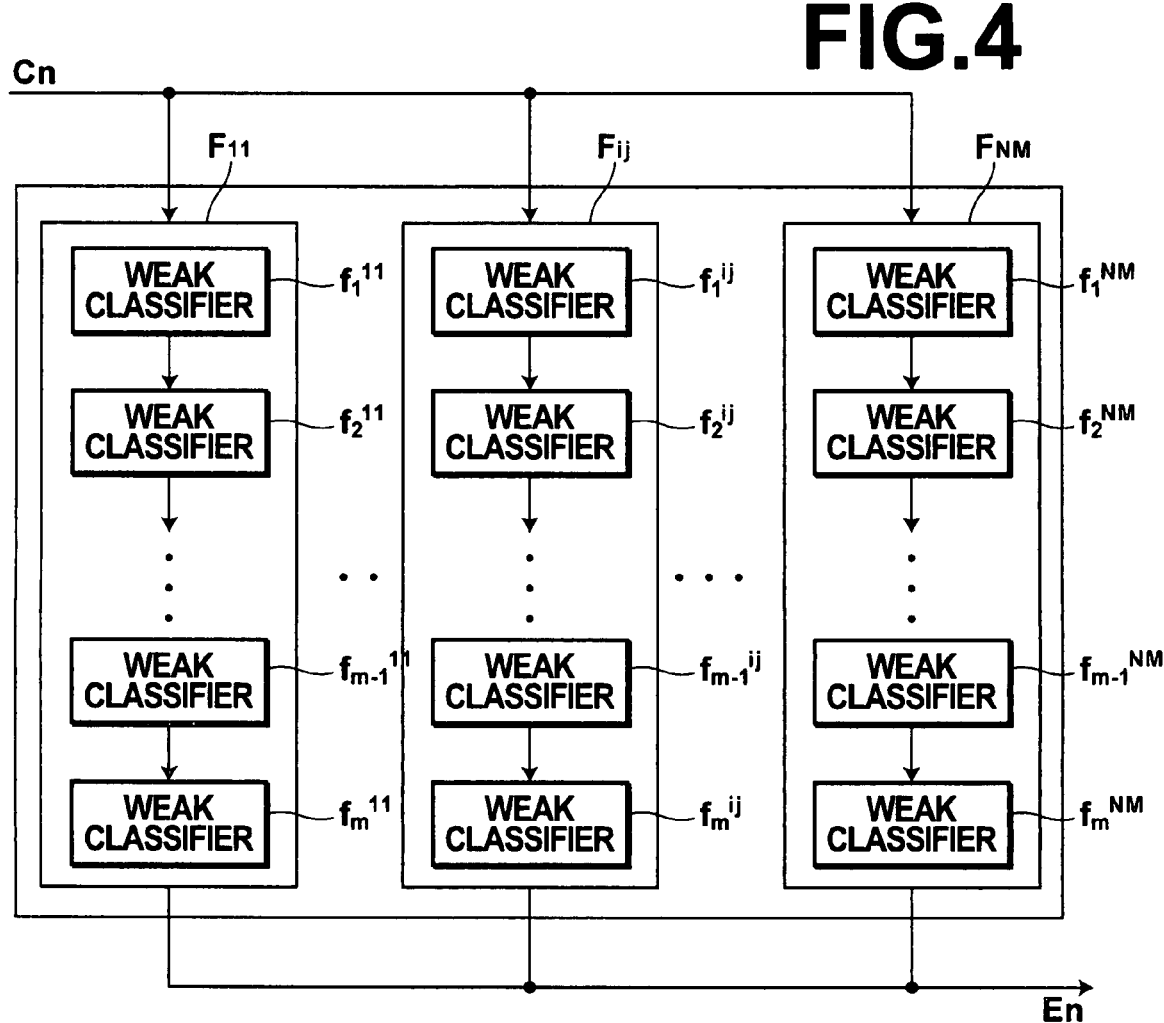
FIG. 4 is a block diagram showing an example of unit region judgment means in the human figure region extraction apparatus in FIG. 1.

The unit region judgment means 30 has a function to judge whether each of the N×M rectangular unit regions $B_{ij}$ (i=1~M, j=1~N) comprising each of the candidate regions Cn determined by the candidate region determination means 20 represents the human figure region Hu, according to an algorithm of Gentle AdaBoost, for example. As shown in FIG. 4, the unit region judgment means 40 comprises N×M unit region classifiers $F_{ij}$ respectively corresponding to the unit regions $B_{ij}$ and carrying out the judgment as to whether the corresponding unit regions represent the human figure region Hu. Each of the unit region classifiers $F_{ij}$ comprises weak classifiers $f_1^{ij} \sim f_m^{ij}$ (where m is the number of the weak classifiers) each of which extracts different characteristic quantities x from the corresponding unit region $B_{ij}$ and carries out the judgment by using the characteristic quantities x. Each of the unit region classifiers $F_{ij}$ carries out final judgment as to whether the corresponding unit region $B_{ij}$ represents the human figure region Hu, by using results of the judgment by the weak classifiers $f_1^{ij}$ to $f_m^{ij}$.

More specifically, each of the weak classifiers $f_1^{ij}$ to $f_m^{ij}$ finds totals $H_{ij}$, $S_{ij}$, and $L_{ij}$ from hue (H), saturation (S), and lightness (L) of the respective pixels in the corresponding unit region $B_{ij}$. Thereafter, each of the weak classifiers $f_1^{ij}$ to $f_m^{ij}$ finds differences between the totals $H_{ij}$, $S_{ij}$, and $L_{ij}$ and $H_{uv}$, $S_{uv}$, and $L_{uv}$ in the other unit regions $B_{uv}$ (u=1~M, v=1~N, u≠i, v≠i) in the corresponding candidate region Cn, and generates a difference list $D_{ij}$ whose elements are all the differences having been found. The difference list $D_{ij}$ has the elements that are 3×(M×N−1) differences, that is, the differences in values of H, S, and L between the unit region $B_{ij}$ and the (M×N−1) unit regions excluding the unit region $B_{ij}$ in the corresponding candidate region Cn. The unit region judgment means 30 uses the differences or a combination of predetermined ones of the differences in the difference list $D_{ij}$ as the characteristic quantities x. Each of the weak classifiers $f_1^{ij}$ to $f_m^{ij}$ extracts a combination of one or more of the differences in the difference list $D_{ij}$ as the characteristic quantities x thereof, and carries out the judgment as to whether the corresponding unit region $B_{ij}$ represents the human figure region Hu based on the characteristic quantities x.

Although the case where each of the weak classifiers $f_1^{ij}$ to $f_m^{ij}$ extracts the characteristic quantities x has been described as an example, the characteristic quantities x may be extracted in advance from the difference list $D_{ij}$ and input to each of the weak classifiers $f_1^{ij}$ to $f_m^{ij}$.

The case has been described above as an example where the unit region judgment means 30 carries out the judgment as to whether each of the unit regions $B_{ij}$ represents the human figure region Hu by using the differences in the values of H, S, and L from the other unit regions. However, this judgment may be carried out by using a known method such as an image judgment method described in Japanese Unexamined Patent Publication No. 2006-058959 or an image characteristic analysis method described in J. R. Smith and Shih-Fu Chang, "Tools and Techniques for Color Image Retrieval", IS&T/SPIE Proceedings Vol. 2670, Storage and Retrieval for Image and Video Databases IV, pp. 1-12.

Figure 5:
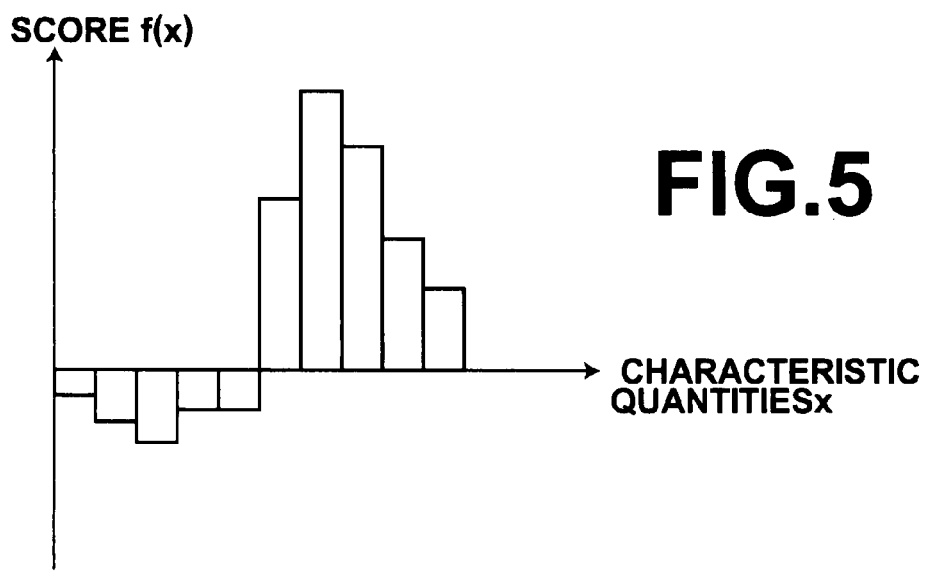
FIG. 5 is a graph showing an example of a characteristic between characteristic quantities and a score of a weak classifier shown in FIG. 4.

Each of the weak classifiers $f_1^{ij}$ to $f_m^{ij}$ has a characteristic between the characteristic quantities x and a score as shown in FIG. 5. Scores $f_1^{ij}(x)$ to $f_m^{ij}(x)$ corresponding to the values of the characteristic quantities x are output according to the characteristic. By carrying out judgment as to whether a total of the scores for the corresponding weak classifiers becomes a preset threshold value or larger, the corresponding unit region $B_{ij}$ is judged to represent the human figure region Hu if the total is equal to or larger than the threshold value.

Below will be described generation of the unit region classifiers $F_{ij}$ that judge whether the respective unit regions $B_{ij}$ represent the human figure region Hu, through sequential generation of the weak classifiers $f_n^{ij}$ (n=1~m) according to the algorithm of Gentle AdaBoost.

A set of training samples $(X_r, Y_r)$ (where r is the number of the samples) is generated from images wherein human figure regions are known. More specifically, each of the images are enlarged or reduced so as to cause a width of a neck therein to be a predetermined length (such as the horizontal width of the unit region $B_{ij}$), and a rectangular partial image of the predetermined size (N·w×M·h pixels) is extracted with reference to the center position N of the neck. The extracted partial image can be divided into the N×M rectangular unit regions $B_{ij}$ (i=1~M, j=1~N) of the predetermined size (w×h pixels) that are used as the training samples $X_r$. A label Y (Y∈{−1, 1}) representing whether each of the training samples $X_r$ represents a human figure region is determined. The case where $Y_r = -1$ represents the corresponding training sample being labeled as a background region B while the case $Y_r = 1$ represents the corresponding training sample being labeled as a human figure region.

A weight $W^t(r)$ is then set to be uniform for all the training samples and the weak classifier $f_n^{ij}$ causing a weighted square error $e_t$ described by Equation (1) below to be minimal is generated. The weight $W^t(r)$ denotes a weight of each of the training samples $X_r$ in the $t^{th}$ repetition:

$$e_t = \sum_r W^t(r)(f_n^{ij}(X_r) - Y_r)^2 \quad (1)$$

Thereafter, by using the weak classifier $f_n^{ij}$, the weight for each of the training samples for the $t^{th}$ repetition is updated according to Equation (2) below:

$$W^{t+1}(r) = W^t(r)e^{-Y_r f_n^{ij}(X_r)} \quad (2)$$

Generation of the weak classifier is repeated until the unit region classifier $F_{ij}$ combining all the weak classifiers having been generated through the repetition of these procedures for a predetermined number of times (T times) can judge the set of the training samples with desired performance.

The unit region classifier $F_{ij}$ can judge whether the corresponding unit region represents the human figure region Hu by judging a sign of a total of judgment results by all the weak classifiers thereof, that is, by judging whether a score of the unit region classifier $F_{ij}$ shown by Equation (3) below is a positive or negative value:

$$F_{ij}(X) = \sum_{n=1}^{m} f_n^{ij}(X) \tag{3}$$

Although the case where the unit region judgment means 30 obtains the unit region classifiers $F_{ij}$ by using the algorithm of Gentle Adaboost has been described above, another machine learning method such as neural network may be used.

Figure 6A:
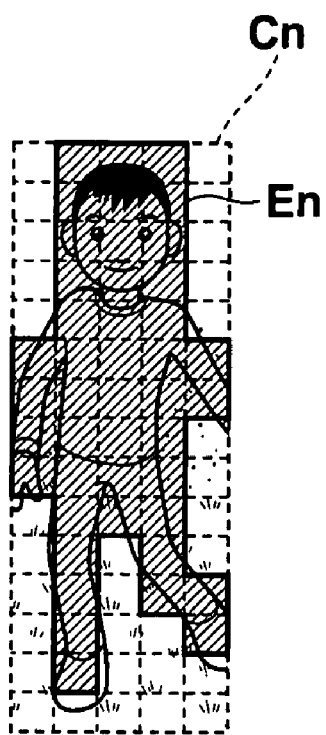
FIGS. 6A and 6B show a method of determining an estimated region E by estimated region determination means in FIG. 1.
Figure 6B:
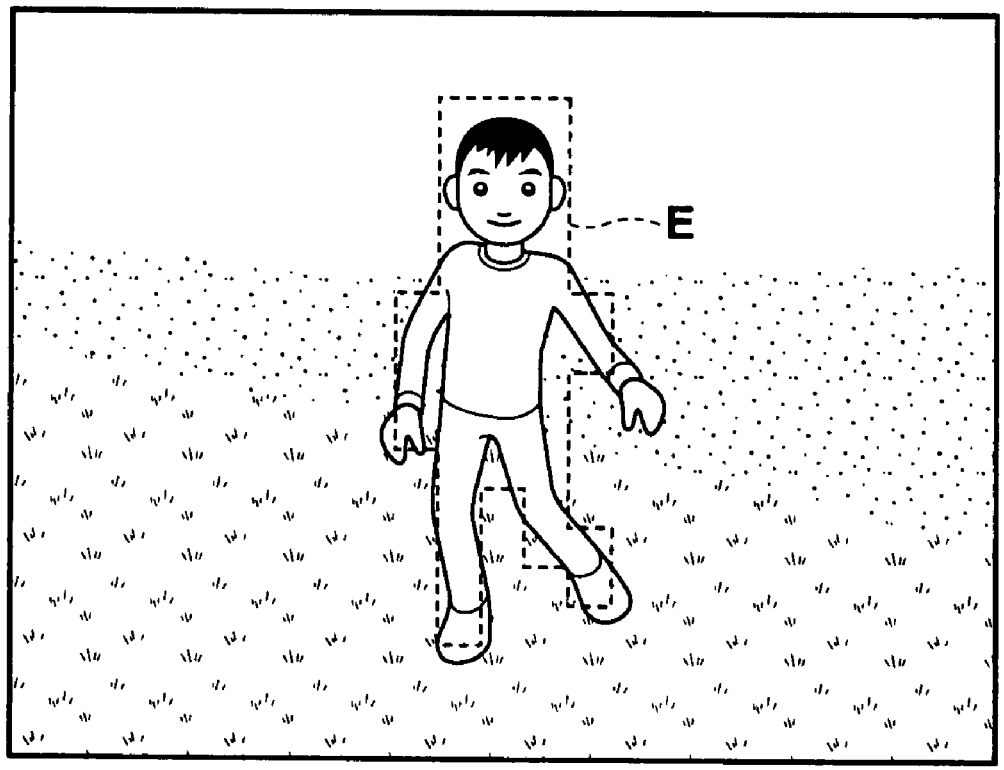

The estimated region determination means 40 determines a set of the unit regions having been judged to represent the human figure region by the unit region judgment means 30 as the estimated region candidate En for each of the candidate regions Cn as shown in FIGS. 6A and 6B. The estimated region determination means 40 selects the optimal estimated region candidate from the estimated region candidates E1~Ek, and determines the selected estimated region candidate as the estimated region E that is estimated to include the human figure region Hu. More specifically, the estimated region determination means 40 sums the scores of the unit region classifiers $F_{ij}$ shown by Equation (3) above for all the unit regions in each of the estimated region candidates En, and selects the estimated region candidate having the highest sum of the scores. The estimated region determination means 40 determines the selected estimated region candidate as the estimated region E that is estimated to include the human figure region Hu.

The score of each of the unit region classifiers Fij can be used as an index representing a likelihood that the corresponding unit region is a region representing the human figure region. Therefore, the estimated region having the highest total score can be interpreted as a region that is most likely to include the human figure region. Consequently, the estimated region candidate having the highest total score of the corresponding unit region classifiers $F_{ij}$ is determined as the estimated region E. However, the estimated region candidate having the largest number of the unit regions that have been judged to represent the human figure region may be determined as the estimated region E, instead of using the score described above.

The human figure region extraction means 50 calculates an evaluation value for each of pixels in the estimated region E, based on image data in the estimated region E determined by the estimated region determination means 40 and image data of an outside region B located outside the estimated region E. The human figure region extraction means 50 extracts the human figure region Hu based on the evaluation value. In the description below for this embodiment, the evaluation value is a likelihood.

A set of pixels in the estimated region E and a set of pixels in the outside region B located outside the estimated region E are firstly divided into 8 sets each according to a color clustering method described in M. Orchard and C. Bouman, "Color Quantization of Images", IEEE Transactions on Signal Processing, Vol. 39, No. 12, pp. 2677-2690, 1991.

In the color clustering method, a direction along which variation in colors (color vectors) is greatest is found in each of clusters (the sets of pixels) $Y_n$, and the cluster $Y_n$ is split into two clusters $Y_{2n}$ and $Y_{2n+1}$ by a plane that is perpendicular to the direction and passes a mean value (mean vector) of the colors of the cluster $Y_n$. According to this method, the whole set of pixels having various color spaces can be segmented into subsets of the same or similar colors.

A mean vector $u_{rgb}$, a variance-covariance matrix $\Sigma$, and the like of a Gaussian distribution of R (Red), G (Green), and B (Blue) are calculated for each of the 8 sets in each of the regions E and B, and a GMM (Gaussian Mixture Model) model G is found in an RGB color space in each of the regions E and B according to Equation (4) below. The GMM model G found from the estimated region E that is estimated to include more of the human figure region Hu is a human figure region model $G_H$ and the GMM model G found from the outside region B that is located outside the estimated region E and largely includes a background region is a background region model $G_B$.

$$G = \sum_{i=1}^{8} \lambda_i \frac{1}{(2\pi)^{d/2} \Sigma^{1/2}} \exp\left[-\frac{1}{2}(x-u_i)^t \Sigma^{-1}(x-u)\right] \tag{4}$$

In Equation (4), i, $\lambda$, u, $\Sigma$, and d respectively refer to the number of mixture components of the Gaussian distributions (the number of the sets of pixels), mixture weights for the distributions, the mean vectors of the Gaussian distributions of RGB, the variance-covariance matrices of the Gaussian distributions, and the number of dimensions of a characteristic vector.

FIG. 7A is a graph showing R and G in the human figure region model $G_H$ while FIG. 7B is a graph showing R and G in the background region model $G_B$. Each of the graphs comprises 8 elliptic Gaussian distributions, and the human figure region model $G_H$ has different probability density from the background region model $G_B$.

The estimated region E is then cut into the human figure region Hu and the background region B according to region segmentation methods described in Yuri Y. Boykov et al, "Interactive Graph Cuts for Optimal Boundary and Region Segmentation of Objects in N-D images", Proc. of Int. Conf. on Computer Vision, 2001 and C. Rother et al., "GrabCut-Interactive Foreground Extraction using Iterated Graph Cuts", ACM Transactions on Graphics (SIGGRAPH '04), 2004, based on the human figure region model $G_H$ and the background region model $G_B$.

Figure 8A:
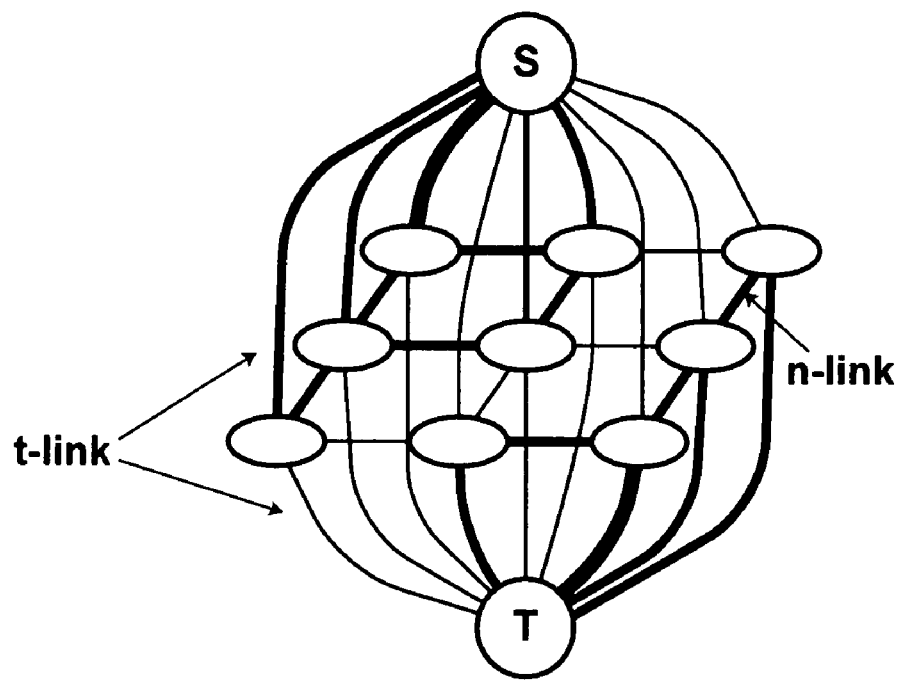
FIGS. 8A and 8B show a method of dividing the estimated region E into a human figure region and a background region.

In the region segmentation methods described above, a graph is generated as shown in FIG. 8A comprising nodes representing the respective pixels in the image, nodes S and T representing labels (either the human figure region Hu or the background region B in this embodiment) for the respective pixels, n-links connecting the nodes of pixels neighboring each other, and t-links connecting the nodes of the respective pixels with the node S representing the human figure region and the node T representing the background region. Each of the n-links represents a likelihood (cost) of the neighboring pixels belonging to the same region by the thickness thereof, and the likelihood (cost) can be found from a distance between the neighboring pixels and a difference in the color vectors thereof. The t-links represent likelihoods (cost) of each of the pixels belonging to the human figure region and to the background region, and the likelihoods (cost) can be found for each of the pixels by calculating probabilities that the color vector thereof corresponds to probability density functions for the human figure region $G_H$ and the background region $G_B$.

Figure 8B:
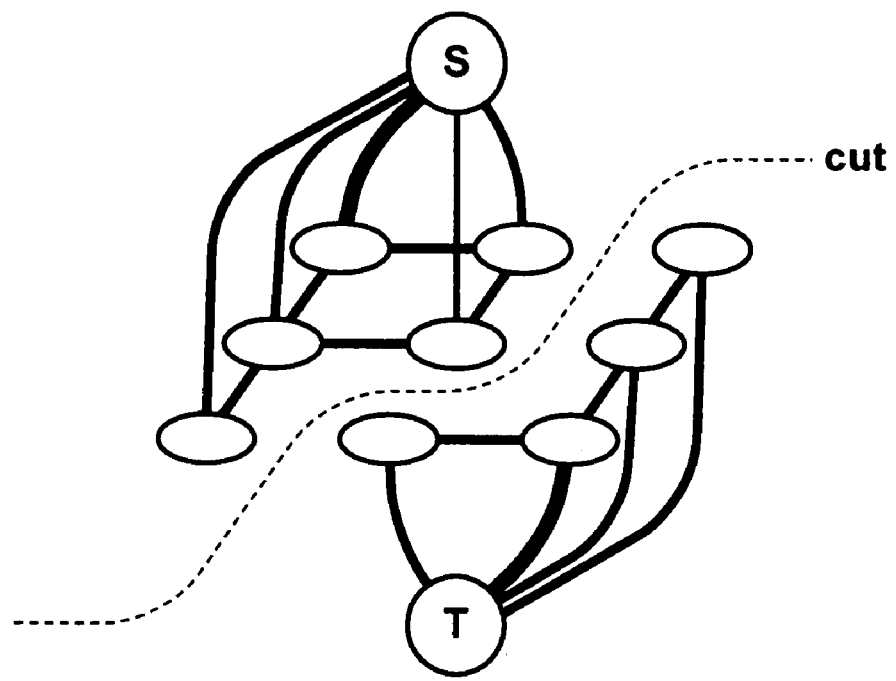

The human figure region and the background region are exclusive to each other, and the estimated region E is cut into the human figure region Hu and the background region B as shown in FIG. 8B by cutting either one of the t-links connecting the node of each of the pixels to the node S or T representing the human figure region or the background region and by cutting the n-links that connect the neighboring nodes having the different labels. By causing a total of the cost for cutting the t-links and the n-links to become minimal, the region segmentation can be carried out optimally, and the human figure region Hu can be detected efficiently.

Furthermore, the human figure region extraction means 50 judges that each of the pixels in the estimated region E is a pixel representing a skin color region in the case where values (0-255) of R, G, and B thereof satisfy Equation (5) below, and updates values of the t-links connecting the nodes of the pixels belonging to the skin color region to the node S representing the human figure region. Since the likelihood (cost) that the pixels in the skin color region are pixels representing the human figure region can be increased through this procedure, human figure region extraction performance can be improved by applying skin color information that is specific to human bodies to the extraction.

$$R>95 \text{ and } G>40 \text{ and } B>20 \text{ and } \max\{R,G,B\}-\min\{R,G,B\}>15 \text{ and } |R-G|>15 \text{ and } R>G \text{ and } R>B \quad (5)$$

Figure 9:
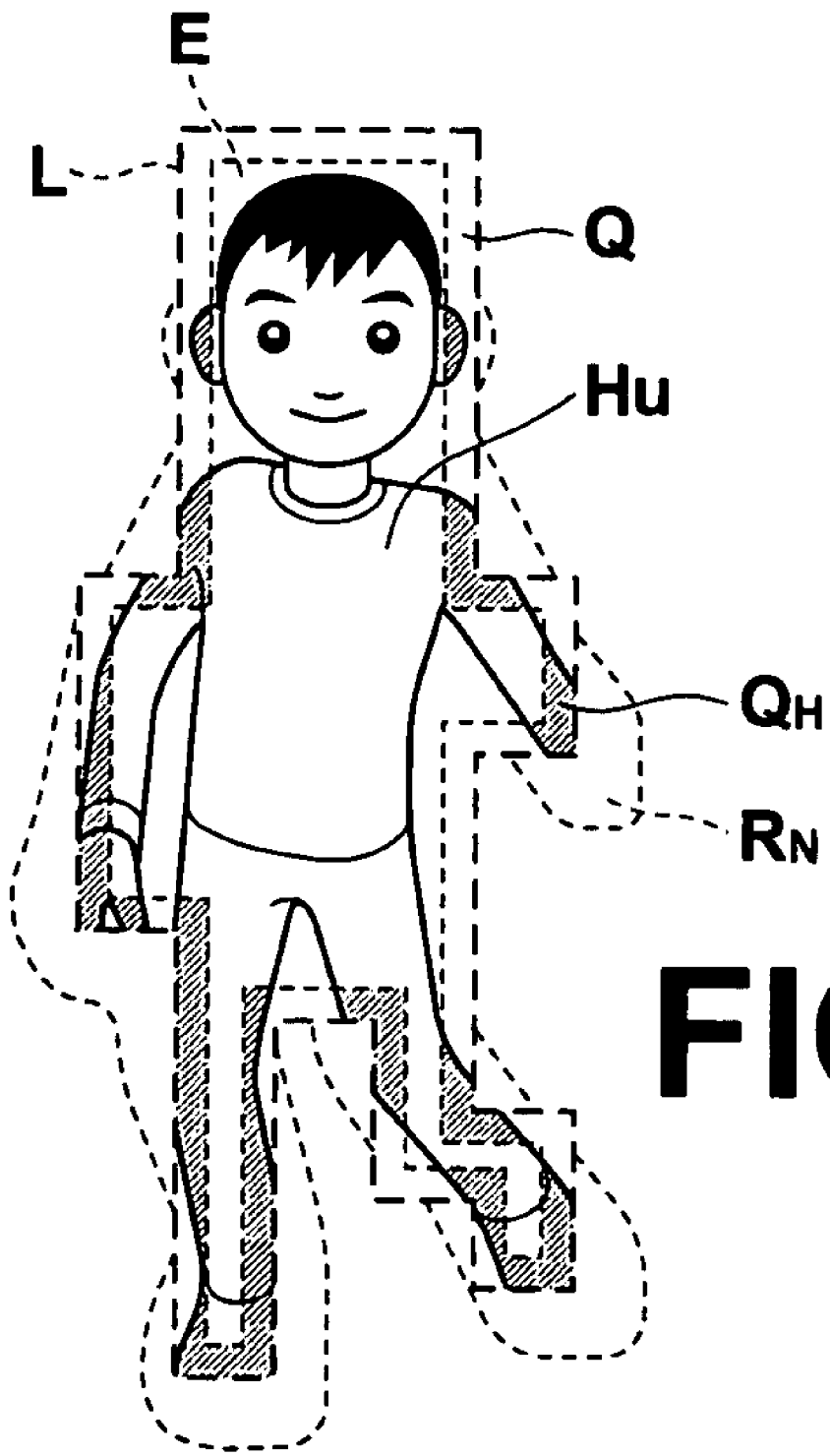
FIG. 9 shows a method of judgment processing and estimated region extension and update processing by judgment means and the estimated region determination means in FIG. 1.

The human figure region presence judgment means 60 judges whether at least a portion of the human figure region Hu extracted by the human figure region extraction means 50 exists in the outline periphery region in the estimated region E. As shown in FIG. 9, the human figure region presence judgment means 60 carries out this judgment by finding presence or absence of a region $Q_H$ wherein the extracted human figure region Hu overlaps an outline periphery region Q that is a region of a predetermined range from an outline L of the estimated region E.

In the case where the human figure region presence judgment means 60 has judged that the human figure region Hu does not exist in the outline periphery region Q, extraction of the human figure region has been completed. However, in the case where at least a portion of the extracted human figure region Hu has been judged to exist in the outline periphery region Q, the estimated region determination means 40 sets as a near outer region $R_N$ a region existing outside the estimated region E in a region of a predetermined range from the region $Q_H$ having the overlap between the human figure region Hu and the outline periphery region Q, and extends and updates the estimated region E to include the near outer region $R_N$. The human figure region extraction means 50 extracts the human figure region Hu again in the extended estimated region E thereafter, and the human figure region presence judgment means 60 again judges whether at least a portion of the extracted human figure region Hu exists in the outline periphery region Q in the extended estimated region E.

The procedures described above, that is, the extension and update of the estimated region E by the estimated region determination means 40, the extraction of the human figure region Hu in the extended estimated region E by the human figure region extraction means 50, and the judgment of presence or absence of at least a portion of the extracted human figure region Hu in the outline periphery region Q by the human figure region presence judgment means 60, are carried out until the human figure region presence judgment means 60 has judged that the human figure region Hu does not exist in the outline periphery region Q.

Figure 10A:
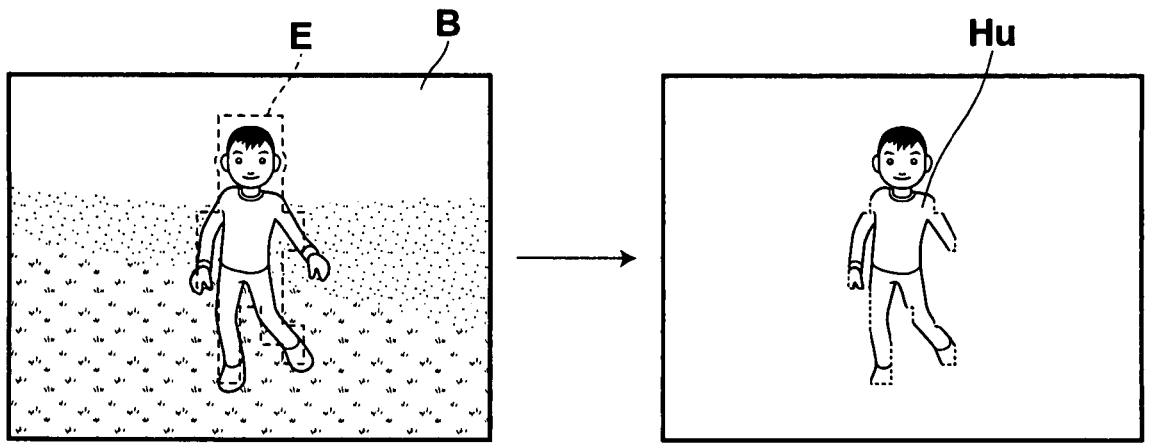
FIG. 10A shows the estimated region E and a human figure region Hu determined and extracted in initial processing while FIGS. 10B and 10C respectively show the estimated region E and the human figure region Hu determined and estimated for the second time and for the final time.
Figure 10B:
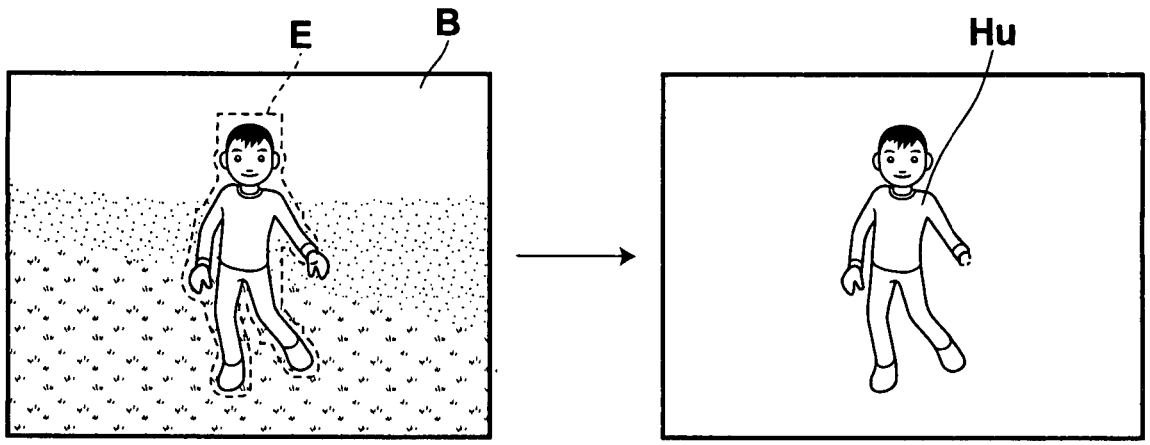
Figure 10C:
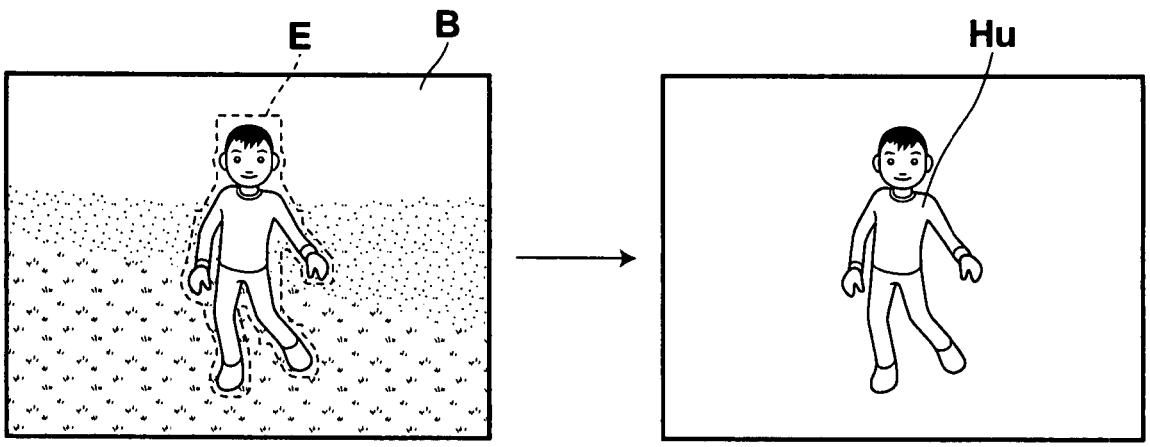

FIGS. 10A to 10C show an example of repetitive extraction of the human figure region Hu while the estimated region E is extended and updated. FIG. 10A shows the estimated region E determined initially and the human figure region Hu extracted in the estimated region E. FIG. 10B shows the region E estimated for the second time by extension and update thereof based on the initial human figure region extraction result shown in FIG. 10A, and the human figure region Hu extracted in the extended estimated region E. FIG. 10C shows the estimated region E determined finally and the human figure region Hu extracted therein.

Figure 11:
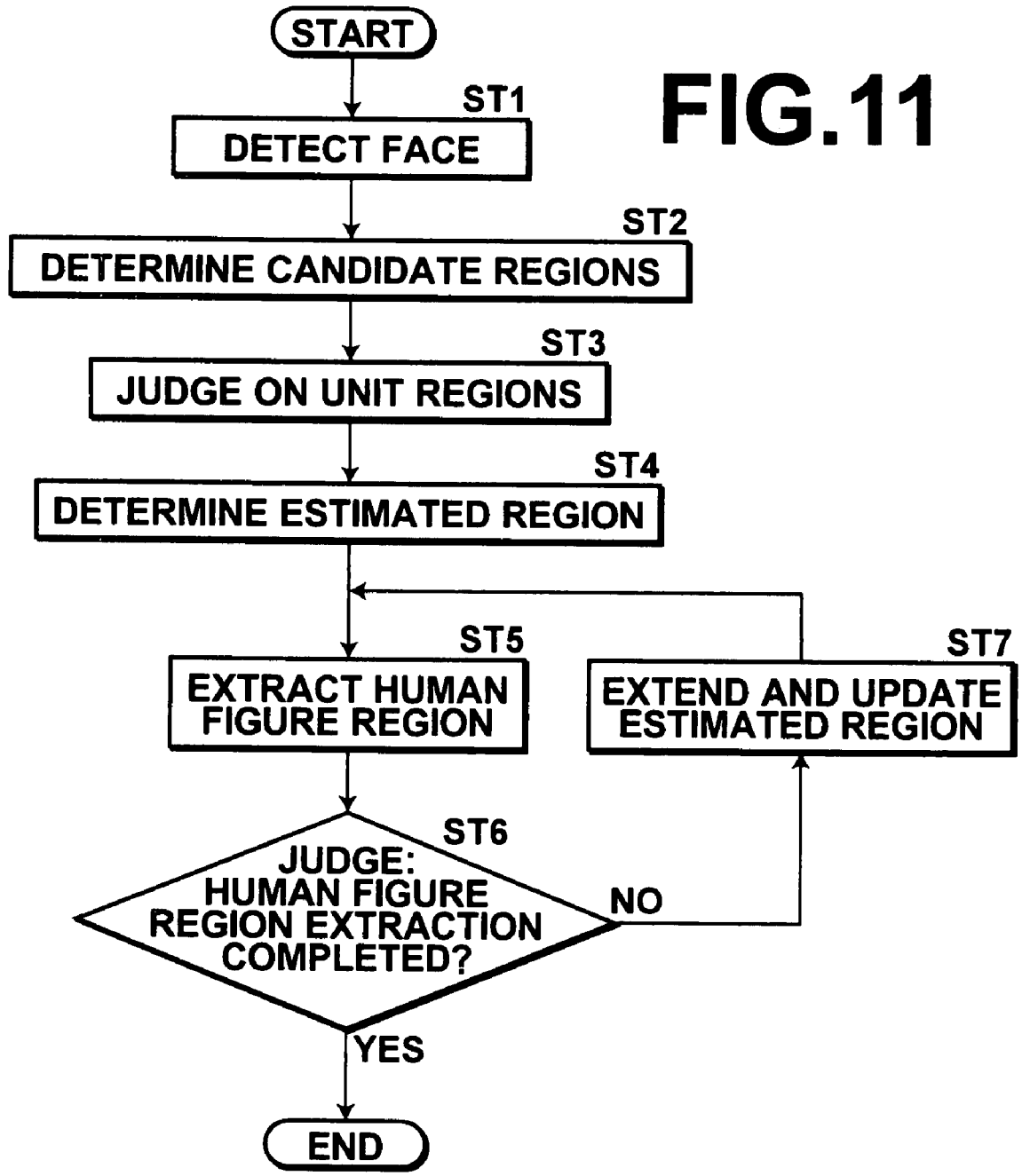
FIG. 11 is a flow chart showing an embodiment of a human figure region extraction method of the present invention.

A human figure region extraction method of the present invention will be described below with reference to a flow chart in FIG. 11 showing an the embodiment of the method. The face detection means 10 detects the eyes F as the facial parts in the image P (Step ST1). The candidate region determination means 20 determines the candidate regions Cn (n=1~k) that are deemed to include the human figure region, based on the position information of the detected eyes F (step ST2). The unit region judgment means 30 carries out the judgment as to whether each of the unit regions comprising the respective candidate regions Cn represents the human figure region (Step ST3). The estimated region determination means 40 determines the set of the unit regions having been judged to represent the human figure region for each of the candidate regions Cn as the estimated region candidate En, and selects the optimal estimated region candidate from the estimated region candidates En. The estimated region determination means 40 then determines the selected estimated region candidate as the estimated region E (Step ST4). The human figure region extraction means 50 extracts the human figure region Hu in the determined estimated region (Step ST5). The human figure region presence judgment means 60 carries out the judgment as to whether at least a portion of the extracted human figure region Hu exists in the outline periphery region in the estimated region E (Step ST6). In the case where a result of the judgment is affirmative, the estimated region E is extended and updated so as to include the near outer region located outside the estimated region E and near the human figure region Hu in the outline periphery region (Step ST7). The flow of processing returns to Step ST5 at which the human figure region Hu is extracted in the extended estimated region E. After repeating the procedures from Step ST5 to Step ST7, the extraction of the human figure region Hu is completed in the case where the human figure region Hu has been judged not to exist in the outline periphery region Q.

According to the embodiment described above, the eyes F as the facial parts are detected in the image P, and the candidate regions C that are deemed to include the human figure region are determined based on the position information of the detected eyes F. The judgment is then made as to whether each of the unit regions comprising the respective candidate regions C represents the human figure region. The set of the unit regions having been judged to include the human figure region is determined as the estimated region E, and the human figure region Hu is extracted in the estimated region E having been determined. In this manner, the human figure region can be automatically extracted from the general image with accuracy.

By carrying out the judgment as to whether at least a portion of the extracted human figure region Hu exists in the outline periphery region Q in the estimated region E and by repeating the procedures of extension and update of the estimated region E so as to include the near outer region $R_N$ located outside the estimated region E and near the human figure region Hu in the outline periphery region Q and extraction of the human figure region Hu in the extended estimated region E until the human figure region Hu has been judged not to exist in the outline periphery region Q, the human figure region Hu can be included in the extended estimated region E based on a result of the human figure region extraction even in the case where the human figure region Hu has not been included in the estimated region E. Therefore, the human figure region can be extracted entirely with accuracy.

In the embodiment of the present invention described above, the candidate regions Cn that are deemed to include the human figure region Hu are determined based on the position information of the detected eyes F, and the judgment is made as to whether each of the unit regions comprising the respective candidate regions Cn represents the human figure region Hu. The set of the unit regions having been judged to represent the human figure region is then determined as the estimated region candidate En for each of the candidate regions Cn, and the optimal estimated region candidate is selected from the estimated region candidates En. The selected estimated region candidate is then determined as the estimated region E. Therefore, the estimated region can be determined appropriately for the human figure region having various sizes and poses, which improves accuracy of the human figure region extraction.

The present invention is not limited to the embodiment described above. For example, the candidate region determination means 20 determines the candidate regions C that are deemed to include the human figure region Hu, based on the position information of the eyes F detected by the face detection means 10 in the above embodiment. However, the face detection means 10 may detect a position of another facial part such as a nose or a mouth, or a position of a face. The candidate region determination means 20 may determine the candidate regions C, based on the position information alone of the face or facial part detected by the face detection means 10, or based on the position information and other information such as size information of the face for the case of face, for example.

For example, in the case where the candidate regions C are determined based on the position alone of the face detected by the face detection means 10, one or more regions of preset shape and size can be determined as the candidate regions C with reference to a center position of the face. In the case where the candidate regions C are determined based on the position information and size information of the face detected by the face detection means 10, the candidate regions C having sizes that are proportional to the size of the face can be determined with reference to the center position of the face.

The candidate regions C may be regions that are sufficient to include the human figure region, and may be regions of an arbitrary shape such as rectangles, circles, or ellipses of an arbitrary size.

In the embodiment above, the candidate region determination means 20 determines the candidate regions C (Cn, n=1~k) that are deemed to include the human figure region, and the judgment is made as to whether each of the unit regions comprising the respective candidate regions Cn represents the human figure region. The estimated region determination means 40 determines the set of the unit regions having been judged to represent the human figure region as the estimated region candidate En for each of the candidate regions Cn, and selects the optimal estimated region candidate to be used as the estimated region E from the estimated region candidates En. However, a single candidate region C may be determined and judgment is made as to whether each unit region comprising the candidate region represents the human figure region. In this case, a set of the unit regions having been judged to represent the human figure region is determined as the estimated region E.

When the human figure region Hu is extracted by the human figure region extraction means 50 through calculation of the evaluation value for each of the pixels in the estimated region E based on the image data of the estimated region E and based on the image data of the outside region B located outside the estimated region E, the image data of the estimated region E and the image data of the outside region B may be image data representing the entirety or a part thereof.

The human figure region extraction means 50 judges whether each of the pixels in the estimated region E represents the skin color region according to the condition represented by Equation (5) above. However, this judgment may be carried out based on skin color information that is specific to the human figure in the image P. For example, a GMM model G represented by Equation (4) above may be generated from a set of pixels judged to satisfy the condition of Equation (5) in a predetermined region such as in the image P, as a probability density function including the skin color information specific to the human figure in the image P. Based on the GMM model, whether each of the pixels in the estimated region E represents the skin color region can be judged again.

In the above embodiment, the human figure region presence judgment means 60 judges presence or absence of the region $Q_H$ having an overlap between the outline periphery region Q and the human figure region Hu, and the estimated region determination means 40 extends and updates the estimated region E so as to include the near outer region $R_N$ located outside the estimated region E out of the region of the predetermined range from the region $Q_H$, in the case where the region $Q_H$ has been judged to exist. However, the estimated region E may be extended and updated through judgment of presence or absence of at least a portion of the extracted human figure region Hu in the outline periphery region Q in the estimated region E according to a method described below or according to another method.

Figure 12:
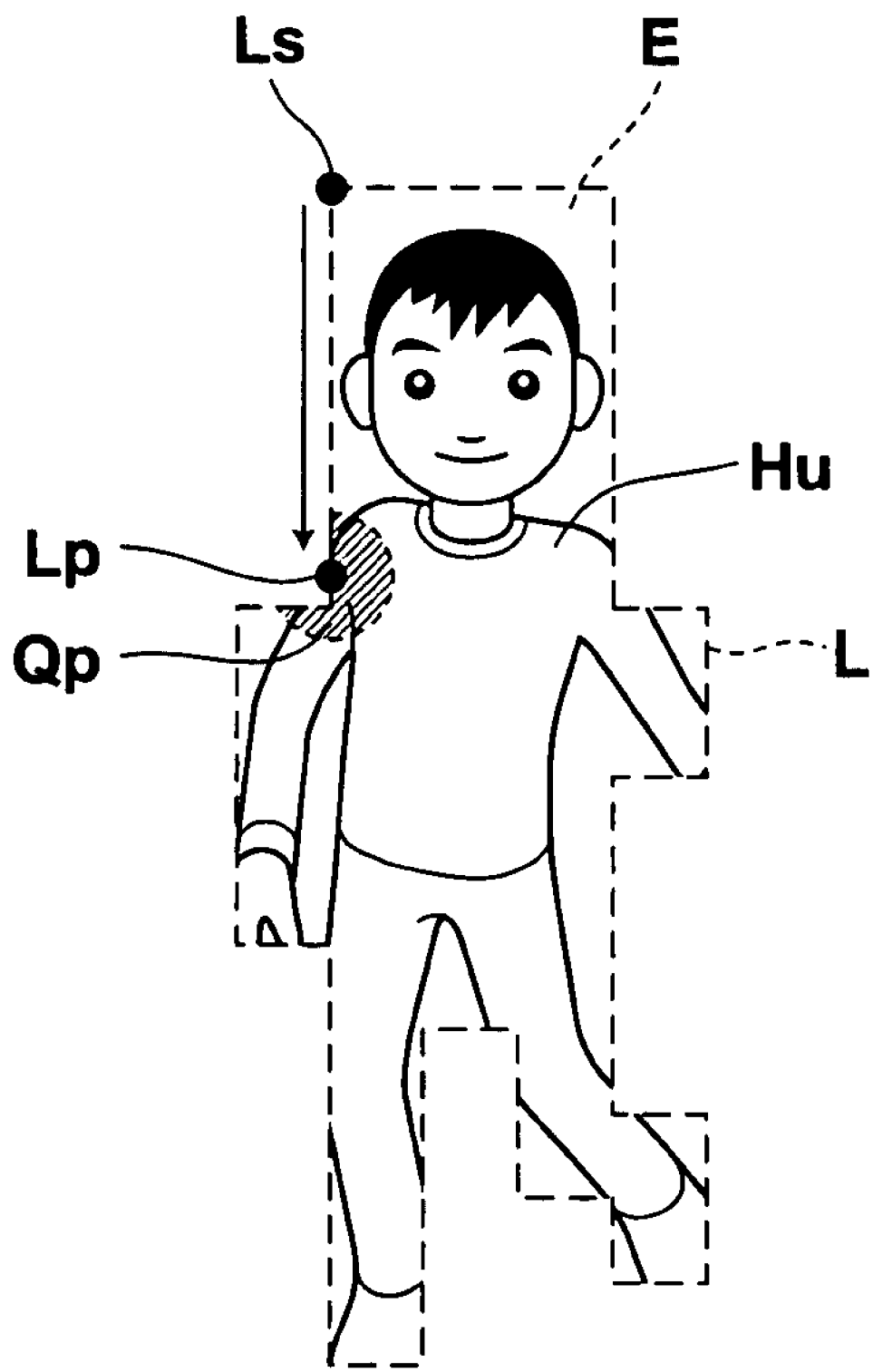
FIG. 12 shows another method for the judgment processing and the estimated region extension and update processing by the judgment means and the estimated region determination means.
Figure 13A:
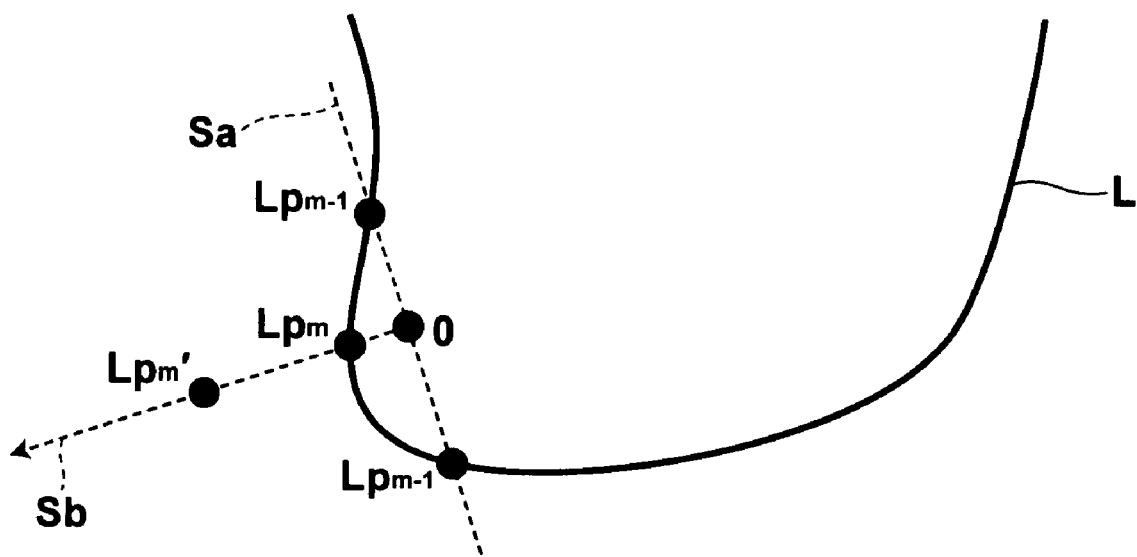
FIGS. 13A and 13B show another method of extending and updating the estimated region E by the estimated region determination means.
Figure 13B:
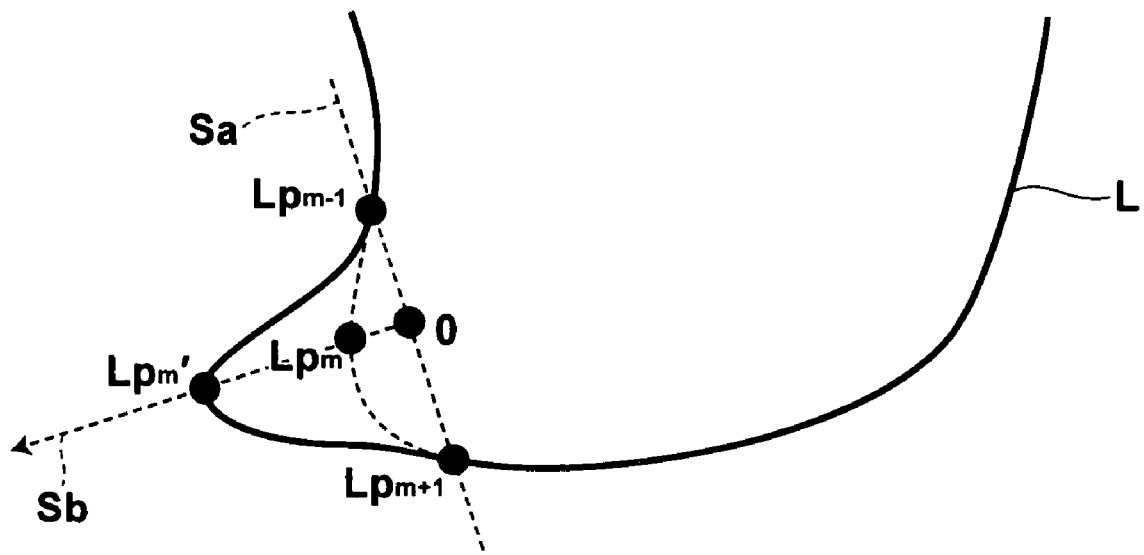

More specifically, as shown in FIG. 12, let a predetermined point on the outline L of the estimated region E be a starting point $L_s$ and let a target pixel $L_p$ sequentially denote each of the pixels along the outline L in clockwise or counterclockwise direction from the starting point $L_s$. Whether at least a portion of the extracted human figure region Hu exists in the outline periphery region Q can be judged through judgment as to whether the human figure region Hu exists in a region $Q_p$ inside the estimated region E in a region of a predetermined range from the pixel $L_p$. In the case where presence of at least a portion of the extracted human figure region has been found, a position of the target pixel $L_p$ is updated according to a method described below. Firstly, as shown in FIG. 13A, find a straight line Sa passing pixels $Lp_{m-1}$ and $Lp_{m+1}$ sandwiching a pixel $Lp_m$ whose position is to be updated along the outline L, and find an outward normal Sb passing the pixel $Lp_m$ from the line Sa. Let the intersection of the lines Sa and Sb be denoted by O. The position of the pixel $Lp_m$ is updated to a point $Lp_m'$ on the normal Sb at a predetermined distance λ (where λ is an increment to grow the outline L once) from the point O. Thereafter, as shown in FIG. 13B, the outline L of the estimated region E is updated to pass the point $Lp_m'$, and the estimated region E is updated as a region surrounded by the updated outline L. In this manner, the estimated region E can be extended and updated.

In the above embodiment, the extension and update of the estimated region E and the human figure region extraction in the extended estimated region E and the like are carried out in the case where the human figure region presence judgment means 60 has judged that at least a portion of the extracted human figure region Hu exists in the outline periphery region Q of the estimated region E. However, the extension and update of the estimated region E and the extraction of the human figure region Hu therein may be carried out in the case where the number of positions at which the human figure region Hu exists in the outline periphery region Q in the estimated region E is equal to or larger than a predetermined number.

In the above embodiment, the extension and update of the estimated region E and the extraction of the human figure region Hu therein are repeated until the human figure region Hu has been judged not to exist in the outline periphery region Q. However, a maximum number of the repetitions may be set in advance so that the human figure region extraction can be completed within a predetermined number of repetitions that is preset to be equal to or larger than 1.

What is claimed is:

1. A human figure region extraction method for extracting a human figure region in an image, the method comprising the steps of:
    detecting a face or facial part in the image;
    determining a candidate region deemed to include the human figure region, based on position information of the face or facial part having been detected;
    carrying out judgment as to whether each unit region of 2 pixels or more comprising the determined candidate region represents the human figure region;
    determining a set of the unit regions having been judged to represent the human figure region as an estimated region estimated to include the human figure region; and
    extracting the human figure region in the determined estimated region.

2. The human figure region extraction method according to claim 1 further comprising the step of:
    judging whether at least a portion of the extracted human figure region exists in an outline periphery region in the estimated region, the method repeating the steps of:
    extending and updating the estimated region so as to include a near outer region located outside the estimated region and near the human figure region in the outline periphery region;
    extracting the human figure region in the extended and updated estimated region; and
    repeatedly judging whether at least a portion of the extracted human figure region exists in the outline periphery region in the extended and updated estimated region, until the extracted human figure region has been judged not to exist in the outline periphery region.

3. A human figure region extraction apparatus for extracting a human figure region in an image, the apparatus comprising:
    face detection means for detecting a face or facial part in the image;
    candidate region determination means for determining a candidate region deemed to include the human figure region, based on position information of the face or facial part having been detected;
    unit region judgment means for carrying out judgment as to whether each unit region of 2 pixels or more comprising the candidate region represents the human figure region;
    estimated region determination means for determining a set of the unit regions having been judged to represent the human figure region as an estimated region estimated to include the human figure region; and
    human figure region extraction means for extracting the human figure region in the determined estimated region.

4. The human figure region extraction apparatus according to claim 3 further comprising:
    human figure region presence judgment means for judging whether at least a portion of the extracted human figure region exists in an outline periphery region in the estimated region, wherein
    the estimated region determination means, the human figure region extraction means, and the human figure region presence judgment means respectively repeat:
    extending and updating the estimated region so as to include a near outer region located outside the estimated region and near the human figure region in the outline periphery region;
    extracting the human figure region in the extended and updated estimated region; and
    repeatedly judging whether at least a portion of the extracted human figure region exists in the outline periphery region in the extended and updated estimated region, until the human figure region presence judgment means has judged that the extracted human figure region does not exist in the outline periphery region.

5. The human figure region extraction apparatus according to claim 3, wherein the unit region judgment means comprises classifiers corresponding to the respective unit regions and respectively carrying out the judgment as to whether the corresponding unit regions represent the human figure region.

6. The human figure region extraction apparatus according to claim 3,
    the candidate region determination means determining a plurality of candidate regions;
    the unit region judgment means judging whether each unit region of 2 pixels or more comprising the respective candidate regions represents the human figure region; and
    the estimated region determination means determining a set of the unit regions having been judged to represent the human figure region in each of the candidate regions as an estimated region candidate, selecting an optimal estimated region candidate from the estimated region candidates, and determining the selected estimated region candidate as the estimated region estimated to include the human figure region.

7. The human figure region extraction apparatus according to claim 3 wherein the human figure region extraction means calculates an evaluation value for each pixel in the estimated region from image data therein and from image data in an outside region located outside the estimated region, and extracts the human figure region based on the evaluation value.

8. The human figure region extraction apparatus according to claim 4, wherein the unit region judgment means comprises classifiers corresponding to the respective unit regions and respectively carrying out the judgment as to whether the corresponding unit regions represent the human figure region.

9. The human figure region extraction apparatus according to claim 4,
    the candidate region determination means determining a plurality of candidate regions;
    the unit region judgment means judging whether each unit region of 2 pixels or more comprising the respective candidate regions represents the human figure region; and
    the estimated region determination means determining a set of the unit regions having been judged to represent the human figure region in each of the candidate regions as an estimated region candidate, selecting an optimal estimated region candidate from the estimated region candidates, and determining the selected estimated region candidate as the estimated region estimated to include the human figure region.

10. The human figure region extraction apparatus according to claim 4 wherein the human figure region extraction means calculates an evaluation value for each pixel in the estimated region from image data therein and from image data in an outside region located outside the estimated region, and extracts the human figure region based on the evaluation value.

11. The human figure region extraction apparatus according to claim 5,
the candidate region determination means determining a plurality of candidate regions;
the unit region judgment means judging whether each unit region of 2 pixels or more comprising the respective candidate regions represents the human figure region; and
the estimated region determination means determining a set of the unit regions having been judged to represent the human figure region in each of the candidate regions as an estimated region candidate, selecting an optimal estimated region candidate from the estimated region candidates, and determining the selected estimated region candidate as the estimated region estimated to include the human figure region.

12. The human figure region extraction apparatus according to claim 5 wherein the human figure region extraction means calculates an evaluation value for each pixel in the estimated region from image data therein and from image data in an outside region located outside the estimated region, and extracts the human figure region based on the evaluation value.

13. The human figure region extraction apparatus according to claim 6 wherein the human figure region extraction means calculates an evaluation value for each pixel in the estimated region from image data therein and from image data in an outside region located outside the estimated region, and extracts the human figure region based on the evaluation value.

14. The human figure region extraction apparatus according to claim 7, wherein the human figure region extraction means extracts the human figure region by further using skin color information in the image.

15. The human figure region extraction apparatus according to claim 8,
the candidate region determination means determining a plurality of candidate regions;
the unit region judgment means judging whether each unit region of 2 pixels or more comprising the respective candidate regions represents the human figure region; and
the estimated region determination means determining a set of the unit regions having been judged to represent the human figure region in each of the candidate regions as an estimated region candidate, selecting an optimal estimated region candidate from the estimated region candidates, and determining the selected estimated region candidate as the estimated region estimated to include the human figure region.

16. The human figure region extraction apparatus according to claim 8 wherein the human figure region extraction means calculates an evaluation value for each pixel in the estimated region from image data therein and from image data in an outside region located outside the estimated region, and extracts the human figure region based on the evaluation value.

17. The human figure region extraction apparatus according to claim 9 wherein the human figure region extraction means calculates an evaluation value for each pixel in the estimated region from image data therein and from image data in an outside region located outside the estimated region, and extracts the human figure region based on the evaluation value.

18. The human figure region extraction apparatus according to claim 10, wherein the human figure region extraction means extracts the human figure region by further using skin color information in the image.

19. A computer-readable recording medium storing a program for extracting a human figure region in an image, the program causing a computer to:
detect a face or facial part in the image;
determine a candidate region deemed to include the human figure region, based on position information of the face or facial part having been detected;
carry out judgment as to whether each unit region of 2 pixels or more comprising the candidate region represents the human figure region;
determine a set of the unit regions having been judged to represent the human figure region as an estimated region estimated to include the human figure region; and
extract the human figure region in the determined estimated region.

20. The computer-readable recording medium storing the program according to claim 19, the program further causing the computer to judge whether at least a portion of the extracted human figure region exists in an outline periphery region in the estimated region, and the program causing the computer repeat:
extending and updating the estimated region so as to include a near outer region located outside the estimated region and near the human figure region in the outline periphery region;
extracting the human figure region in the extended and updated estimated region; and
repeatedly judging whether at least a portion of the extracted human figure region exists in the outline periphery region in the extended and updated estimated region, until the extracted human figure region has been judged not to exist in the outline periphery region.

* * * * *